(12) United States Patent
Hauck et al.

(10) Patent No.: US 10,226,955 B2
(45) Date of Patent: Mar. 12, 2019

(54) METHOD FOR SETTING UP AND OPERATING AN INKJET PRINTING MACHINE FOR A PRINT JOB

(71) Applicant: HEIDELBERGER DRUCKMASCHINEN AG, Heidelberg (DE)

(72) Inventors: Axel Hauck, Karlsruhe (DE); Sabine Roehl, Heidelberg (DE); Michael Kaiser, Heidelberg (DE); Rolf Mueller, Nussloch (DE); Nikolaus Pfeiffer, Heidelberg (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 15/936,683

(22) Filed: Mar. 27, 2018

(65) Prior Publication Data
US 2018/0281487 A1    Oct. 4, 2018

(30) Foreign Application Priority Data

Mar. 29, 2017    (DE) .................. 10 2017 205 280

(51) Int. Cl.
*B41J 29/393*    (2006.01)
*B41J 2/21*    (2006.01)
(Continued)

(52) U.S. Cl.
CPC ........... *B41J 29/393* (2013.01); *B41J 2/2103* (2013.01); *B41J 2/2132* (2013.01); *B41J 11/002* (2013.01);
(Continued)

(58) Field of Classification Search
CPC ...... B41J 29/393; B41J 2/2103; B41J 11/002; B41J 11/0015
(Continued)

(56) References Cited

U.S. PATENT DOCUMENTS

| 5,502,468 A | 3/1996 | Knierim |
| 7,050,196 B1 | 5/2006 | Piatt et al. |

(Continued)

FOREIGN PATENT DOCUMENTS

| DE | 69324225 T2 | 7/1999 |
| DE | 102011015603 B3 | 8/2012 |

(Continued)

*Primary Examiner* — An Do
(74) *Attorney, Agent, or Firm* — Laurence A. Greenberg; Werner H. Stemer; Ralph E. Locher

(57) ABSTRACT

A method for setting up and carrying out a print job on an inkjet printing machine having print heads and a thermal dryer includes printing onto a substrate using water-based black and chromatic inks. First test prints of a first test chart with different area coverage test patches are generated on the substrate using black ink, thermally drying the first test prints at different temperatures and evaluating dried first test prints to determine a dryer operating temperature during the print job. A second test print of a second test chart with different ink amount test patches is generated on the substrate using chromatic inks, thermally drying the second test print at the temperature, and evaluating the dried second test print to determine a total ink amount for operating the print heads during the print job. The machine receives temperature and total ink amount and prints the print job.

10 Claims, 4 Drawing Sheets

(51) Int. Cl.
*H04N 1/407* (2006.01)
*B41J 11/00* (2006.01)

(52) U.S. Cl.
CPC .... *H04N 1/4078* (2013.01); *B41J 2029/3935* (2013.01)

(58) Field of Classification Search
USPC .......................................... 347/17, 19, 102
See application file for complete search history.

(56) References Cited

U.S. PATENT DOCUMENTS

| | | |
|---|---|---|
| 7,319,547 B2 | 1/2008 | Piatt et al. |
| 7,982,908 B2 | 7/2011 | Kita et al. |
| 8,366,260 B2 | 2/2013 | Gauss et al. |
| 8,412,066 B2 | 4/2013 | Moroney |
| 9,266,368 B2 | 2/2016 | Humet Pous et al. |
| 9,573,383 B2 | 2/2017 | Ukishima |
| 2014/0071191 A1* | 3/2014 | Ueshima ............ B41J 2/07 347/12 |
| 2017/0008299 A1 | 1/2017 | Gracia Verdugo et al. |

FOREIGN PATENT DOCUMENTS

| | | |
|---|---|---|
| DE | 102013107942 A1 | 1/2015 |
| DE | 102015116852 A1 | 4/2016 |
| EP | 1168822 A1 | 1/2002 |
| EP | 1594014 A1 | 11/2005 |
| EP | 1832429 A2 | 9/2007 |
| EP | 3162579 A1 | 5/2017 |
| WO | 2015110169 A1 | 7/2015 |

\* cited by examiner

METHOD FOR SETTING UP AND OPERATING AN INKJET PRINTING MACHINE FOR A PRINT JOB

CROSS-REFERENCE TO RELATED APPLICATION

This application claims the benefit, under 35 U.S.C. § 119, of German Patent Application DE 10 2017 205 280.5, filed Mar. 29, 2017; the prior application is herewith incorporated by reference in its entirety.

BACKGROUND OF THE INVENTION

Field of the Invention

The present invention relates to a method for setting up and operating an inkjet printing machine for a print job, in which the inkjet printing machine includes at least three inkjet print heads and at least one thermal dryer and the print job is printed onto a printing substrate using water-based black ink and at least two water-based chromatic inks.

The technical field of the invention is the graphic industry and in particular the field of inkjet printing, i.e. of applying and drying or curing liquid ink.

In the known DOD (drop-on-demand) ink printing methods, liquid ink is applied and a print is created on a printing substrate by a print head that generates tiny ink droplets and transfers them to the printing substrate in a touch-free way as print dots in accordance with the image to be printed. The printing substrate may be made of paper, cardboard, or synthetic material and may be sheet-shaped or web-shaped.

Liquid inks, in particular water-based inks and varnishes, are thermally dried on printing substrates by applying electromagnetic radiation (and/or hot air), in particular infrared/IR or NIR radiation to the applied fluid. In that process, the fluid is heated up and the solvent evaporates.

In so-called water-based ink printing, the liquid ink contains water as a carrier of colorants, in particular pigments. The water content needs to be removed from the ink or from the printing substrate when the ink is dried, for instance by evaporation. High-quality prints need large quantities of ink, for instance to attain a large color space, and therefore need to be intensively dried. Too much drying, however, may cause visible defects.

Heidelberger Druckmaschinen AG of Heidelberg, Germany has developed an inkjet printing machine for industrial production. That machine is marketed under the name "Primefire" and prints water-based inkjet inks onto sheets of paper. The machine includes seven successive printing units including print heads for applying the colors CMYK (cyan, magenta, yellow, and black) and OGV (orange, green, violet) to the paper. The applied inks are dried using IR dryers.

European Patent Application EP 1 168 822 A1, corresponding to U.S. Pat. Nos. 7,050,196 and 7,319,547, discloses a method for calibrating a color printer. The method is used to determine the amount of color for solid-tone areas.

SUMMARY OF THE INVENTION

It is accordingly an object of the invention to provide a method for setting up and operating an inkjet printing machine for a print job, which overcomes the hereinafore-mentioned disadvantages of the heretofore-known methods of this general type and which allows high-quality ink prints to be created in an industrial environment due to accurate ink application and accurate ink curing.

With the foregoing and other objects in view there is provided, in accordance with the invention, a method for setting up and operating an inkjet printing machine for a print job, the inkjet printing machine including at least three ink print heads and at least one thermal dryer for printing the print job onto a printing substrate using water-based black ink and at least two water-based chromatic inks. The method includes the steps of a) generating multiple first test prints of a first test chart with at least two or more test patches of different area coverages on the printing substrate using the water-based black ink, thermally drying the first test prints at different temperatures, and evaluating the dried first test prints to determine a temperature T for the operation of the dryer during the print job; b) generating a second test print of a second test chart with at least two or more test patches of different ink amounts on the printing substrate using the at least two water-based chromatic inks, thermally drying the second test print at the temperature T, and evaluating the dried second test print to determine a total amount M of ink for operating the print heads during the print job; and c) providing the temperature T and the total amount of ink M to the inkjet printing machine for the print job and carrying out the print job.

The method of the invention, in particular the values of the drying temperature T and of the total ink amount M that have been determined in accordance with the invention allow high-quality ink prints to be produced, preferably in an industrial environment, by precise ink application and precise ink curing. High-quality prints may advantageously be produced and a high ink limit (for an individual color) or a high total ink limit (for all colors together, i.e. printed on top of one another, corresponding to total amount of ink M) and consequently a wide color space may advantageously be achieved. Moreover, the method of the invention advantageously prevents printed products from being dried incompletely and paper sheets from sticking together. The method advantageously allows an inkjet printing machine to be set up and operated in an automated and consequently time-efficient way. In this way, waste prints may in particular be avoided.

The values for T and M that have been determined in this way for the printing substrate that was used in the evaluation (in combination with the applied inks) may be saved for instance on a computer or rather the memory thereof and may advantageously be very quickly retrieved for identical print jobs (using the same printing material and the same inks) at a later time.

The method may be carried out as a function of the transport speed of the printing substrate since the transport speed has an influence on the curing result due to the available curing time (curing path length/transport speed ratio). Speed-dependent values for T and M may likewise be saved in an advantageous way and retrieved as needed.

The at least three inkjet print heads mentioned in the method of the invention may be at least three groups of inkjet print heads. Such groups may include inkjet print heads disposed next to one another in a direction transverse to the direction of transport of the printing material, forming a so-called print bar. The test prints may be generated by a respective inkjet print head of a group or alternatively by a respective plurality thereof.

Another preferred development of the invention may be distinguished by the step of evaluating the dried first test prints by inspecting at least one test patch of the first test chart to determine whether the dried printing substrate and/or the dried water-based black ink is free from visible/optically detectable defects. Such defects may be matte/gloss differences or even the formation of bubbles.

A further preferred development of the invention may be distinguished in that the evaluation is made in all test patches of the first test chart.

An added preferred development of the invention may be distinguished in that the dried first test prints are optically evaluated, in particular using an optical camera and a device for digital image processing.

An additional preferred development of the invention may be distinguished in that the evaluation of the dried second test chart is done by inspecting at least one test patch of the second test chart to determine whether the dried water-based chromatic inks reach or stay below a defined resistance threshold, in particular the SR value (surface resistance value). The SR value may, for instance, be determined by commercial measuring devices in a contact resistance measurement, for instance using a device marketed as HK-300-2 by Kett Instruments. In accordance with the invention, such a measurement may be taken in an automated way in the printing machine, at a control console, on a measurement table, or in a dedicated peripheral device.

Another preferred development of the invention may be distinguished in that the evaluation is made in all test patches of the second test chart.

An added preferred development of the invention may be distinguished in that the dried second test print is evaluated by using a resistance measurement, in particular by using a resistance sensor.

A concomitant development of the invention that is preferred in terms of a computer-assisted implementation may be distinguished in that:

a) a first test chart is printed onto a substrate using water-based black ink and thermally dried at a temperature Ti; and a value Ki, where Ki=1 or Ki=−1, is determined by evaluating the dried first test chart; step a) is carried out for i=1; step a) is carried out for i=2 to imax at a respective temperature Ti=Ti−1+Ki−1*dT, with dT>0 Kelvin as long as Ki*Ki−1=1; and b) a second test chart is printed onto a substrate using at least two water-based inks and thermally dried at a temperature T=T(imax)−dT$_{safe}$ with T$_{safe}$>0 Kelvin; and the total amount M is determined by evaluating the dried second test chart.

In this context, Ki=1 represents a positive evaluation result (drying result is satisfactory, no visible/detectable defects have been found) and Ki=−1 represents a negative evaluation result (drying result is unsatisfactory, detectable defects have been found).

Other features which are considered as characteristic for the invention are set forth in the appended claims.

Although the invention is illustrated and described herein as embodied in a method for setting up and operating an inkjet printing machine for a print job, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings. The invention as well as preferred further developments thereof will be explained in more detail below with reference to the drawings and based on a preferred exemplary embodiment.

DETAILED DESCRIPTION OF THE INVENTION

Figure 1:
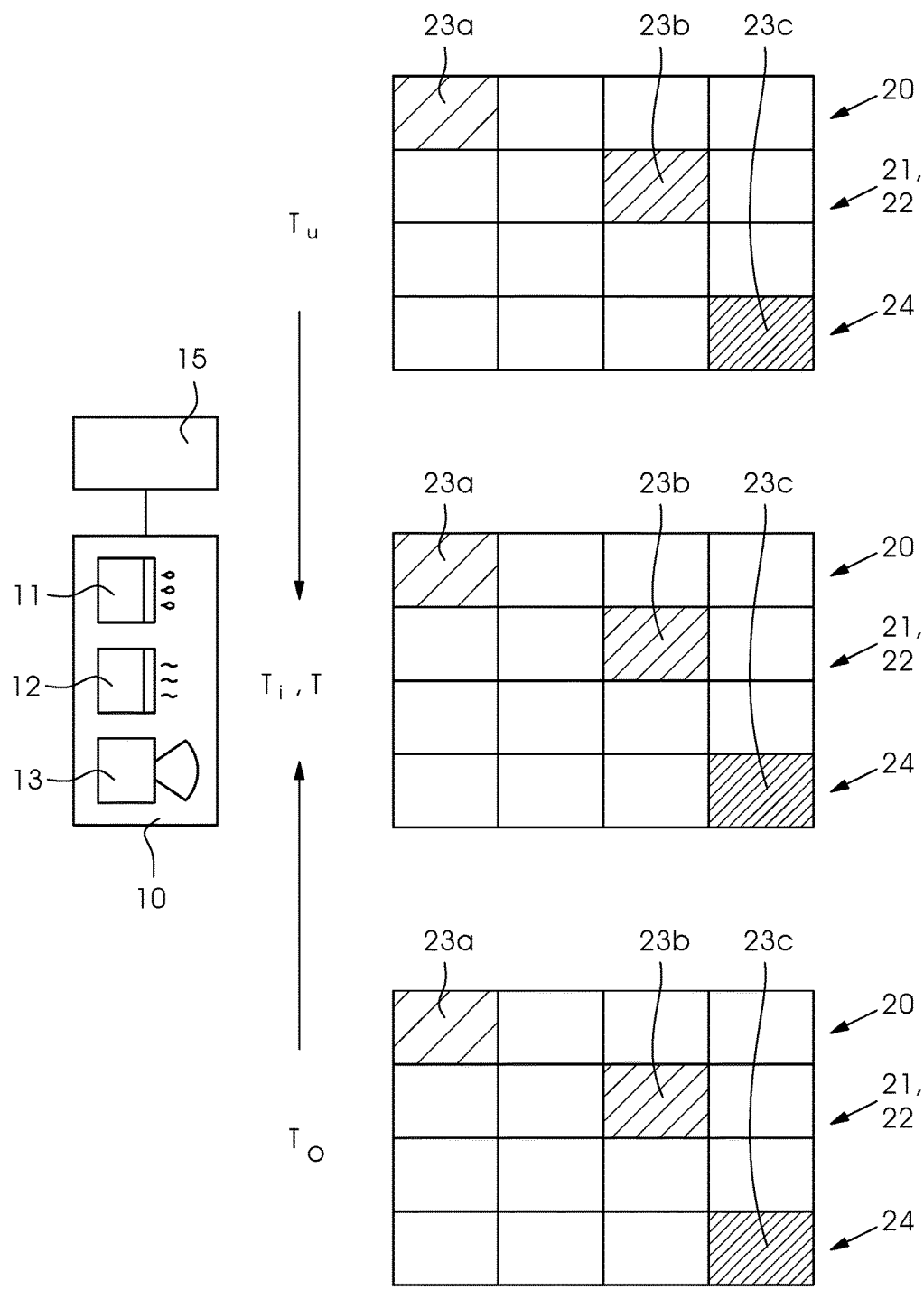
FIG. 1 is a diagrammatic, top-plan view of printing substrates and an inkjet printing machine illustrating steps of a preferred exemplary embodiment of the method of the invention.

Referring now in detail to the figures of the drawings, in which for reasons of clarity, mutually corresponding elements bear the same reference symbols and reference symbols that would be merely repetitive have in part been omitted, and first, particularly, to FIG. 1 thereof, there is seen a diagrammatic illustration of an inkjet printing machine 10 on which or for which the method of the invention for setting up and operating an inkjet printing machine for a print job is implemented. The machine includes at least three ink print heads 11, in particular DoD piezo print heads, and at least one thermal dryer 12, in particular an infrared LED dryer. The machine or a control console/measuring table/peripheral device of the machine according to FIG. 1 includes an optical camera 13 and according to FIG. 2 a resistance sensor 14.

By way of example, FIG. 1 shows three printing substrates 20 (which are assumed without restrictions to be sheets of paper in the following explanations) during a thermal drying process at different temperatures Ti or T (i is the counting index corresponding to the number of different drying temperatures): at a low temperature Tu, at a high temperature To and at respective intermediate temperatures Ti and T. It is possible to thermally dry only two or more than three sheets of paper at temperatures Tu and T, at To and T, for instance, or at further temperatures between the temperatures indicated above.

Each one of the two, three, or more sheets 20 of paper has received a first test chart 21 printed by the inkjet printing machine 10, i.e. each sheet 20 represents a first test print 22. At least sections of the first test chart have been created by one of the at least three ink print heads 11 using water-based black ink 24. The first test chart includes at least two or more test patches 23a-c of different area coverages, for instance in the illustrated matrix configuration. The test patches are preferably solid-tone areas preferably having a thin layer of ink.

The first test chart preferably includes a test patch 23a of low area coverage (<30%) and a test patch 23c of a high area coverage (>70%). The first test chart preferably also includes a test patch 23b of a medium area coverage (30% to 70%). Test patches of low area coverage are very sensitive to too much drying, i.e. they are very temperature-sensitive and will be the first that exhibit defects when they are subjected to too much drying.

Once they have been dried, the first test prints 22/black first test charts 21 that have been dried at different temperatures are evaluated to determine a suitable temperature T for the operation of the dryer 12 during the print job, i.e. for the drying process during the print job. At the suitable temperature T or rather on the associated test print 22 all test patches 23a-c, i.e. at least all test patches that have been evaluated on the test chart 21, have dried to a sufficient degree and without any defects. The temperature T that has been found in this way is then selected from the set of temperatures Ti.

The dried first test prints 22 are optically scanned, in particular by the optical camera 13, for evaluation purposes. Alternatively, visual evaluation is possible. Preferably all test patches 23a-c of the first test chart 21 are optically scanned and evaluated. The evaluation is done in a computer-assisted way, i.e. by using a computer 15, preferably using digital image processing. Every field 23a-c is examined to determine whether the drying result of the respective patch is satisfactory, i.e. whether the ink layer is homogeneous, for instance, and does not exhibit any bubbles and/or tears. The evaluation of the dried first test prints 22 is preferably done by checking, in a computer-assisted way, whether the dried sheet 20 of paper and/or the dried water-based black ink 24 is free from visible defects or free from defects that may be detected in the optical spectrum, e.g. brightness fluctuation.

Figure 2:
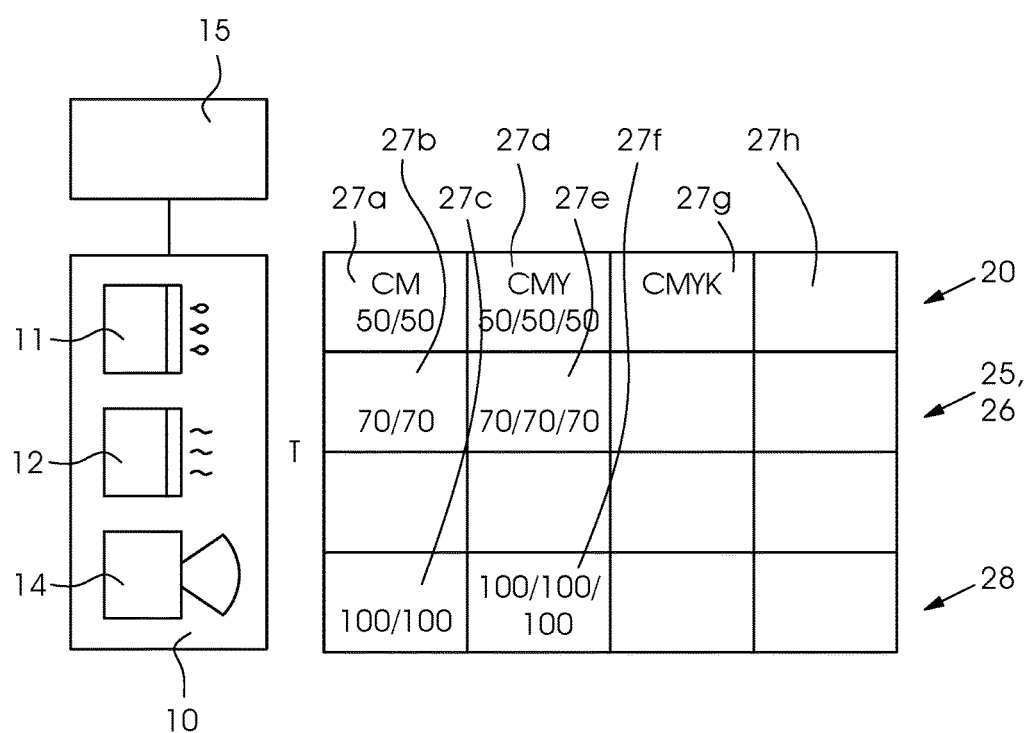
FIG. 2 is a view similar to FIG. 1 illustrating further steps of the preferred exemplary embodiment of the method of the invention.

FIG. 2 illustrates a printing substrate 20 (which is also assumed to be a sheet of paper without restrictions in the following explanation) with a second test print 26 or second test chart 25 and with two or more test patches 27a-h of different amounts of ink. The second test chart or the test patches thereof have been created by two or more of the at least three ink print heads 11 using water-based chromatic ink 28 ("chromatic" meaning not black). The test patches preferably have light inks such as cyan and magenta because for a given drying power and/or for a matching drying temperature T, they dry to a lesser extent than black ink and therefore form very sensitive test patches.

EXAMPLES

Test patch 27a has been printed using the chromatic inks cyan (C) and magenta (M), with cyan printed at 50% of the maximum possible amount of cyan ink (cyan ink limit) and magenta at 50% of the maximum possible amount of magenta ink (magenta ink limit).

Test patch 27e has been printed using the chromatic inks cyan (C), magenta (M), and yellow (Y), with cyan at 50% of the maximum possible amount of cyan ink, magenta at 50% of the maximum possible amount of magenta ink, and yellow at 50% of the maximum possible amount of yellow ink (yellow ink limit).

Test patches including 2, 3, 4, or more chromatic inks (such as cyan, magenta, yellow, orange, green, violet, or other special colors) may be provided. It is also possible additionally to print black ink into a test patch as shown, for instance, in test patch 27g.

Every test patch 27a-h thus has a total amount of ink M (total ink limit) that is calculated as the sum of the ink proportions (ink limits) of the inks that are present in the respective test patch.

The second test print 26 is thermally dried by the dryer 12 at the predetermined suitable temperature T and the dried second test print is evaluated to determine a total amount of ink M for the operation of the print heads during the print job, i.e. for printing during the print job.

For evaluation purposes, the dried second test print 26 is subjected to a resistance measurement, in particular by using the resistance sensor 14. Preferably all test patches 27a-h of the second test chart 25 are scanned and evaluated. The evaluation is again done in a computer-assisted way, i.e. by using the computer 15. In this process, every patch 23a-c is examined to determine whether the drying result for the respective patch is satisfactory, i.e. whether the ink film is homogeneous, for instance, and does not exhibit any bubbles or tears. The evaluation of the dried second test prints 26 is preferably done by checking, in a computer-assisted way, in which test patches the dried chromatic inks 24 reach or stay below a defined resistance threshold, in particular the so-called surface resistance value (SR value), and which one of these patches has the highest and thus the suitable total amount of ink M. Alternatively, the text patches may be examined to find those test patches in which the dried chromatic inks 24 are within a defined resistance value range, in particular the SR value. Another alternative way of testing would be a haptic test for dryness by an experienced machine operator. In practice, the resistance limit or range is found as follows: the first step is to determine experimentally whether one or more sheets have been sufficiently dried (and at which measured value or within which range of values), sufficiently dried meaning that it is possible to deposit the sheets on a stack of sheets without difficulty, in particular without their adhering to one another. The values or value ranges that have experimentally been determined are dependent on the measuring device that is actually used if it does not provide absolute values, and will be used as calibration or for a comparison in later measurements. If varnish will finally be applied to the sheets, the value or value range that is selected will be lower because the varnish introduces additional moisture into the sheets.

Using the first test chart 21 and the second test chart 25, which is different from the former, at least in the relevant test patches, i.e. the ones that are evaluated, the suitable temperature T and the suitable total amount of ink M of the inkjet printing machine are provided in the manner described above and the print job is completed. This means that the print job is carried out in such a way that no location of the image to be printed exceeds the total amount of ink that has been determined in accordance with the invention and the print is dried at the temperature T that has been determined in accordance with the invention.

It is likewise possible to combine the two test prints 22 and 26 or rather the two test charts 21 and 25 and to print and evaluate a joint test chart including all relevant test patches to determine T and M.

Figure 3:
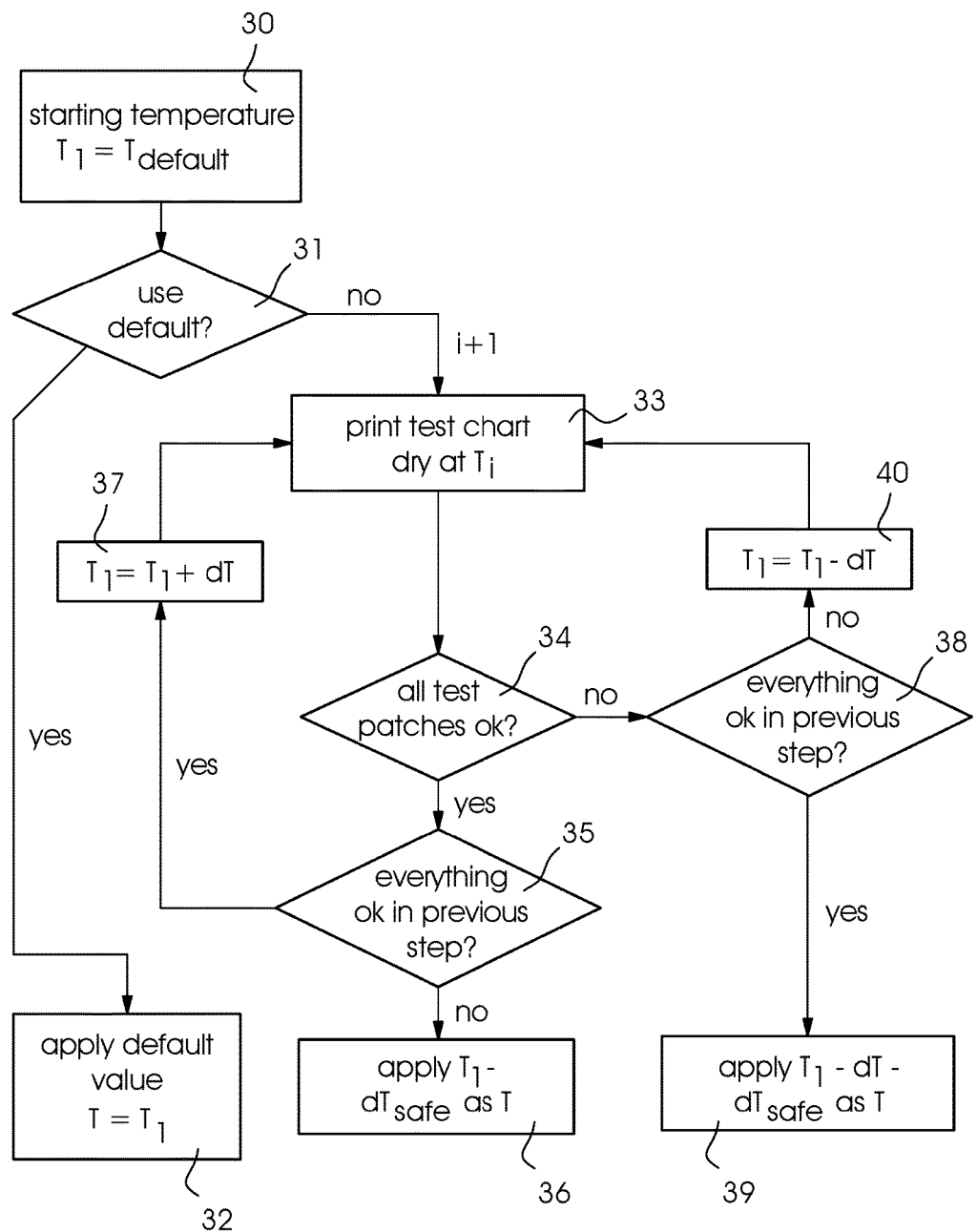
FIG. 3 is a flow chart of steps of a preferred exemplary embodiment of the method of the invention.

The step-by-step sequence of the method shown in FIG. 3 corresponds to the process described in the context of FIG. 1 and will be described below. The steps are taken in a computer-assisted way.

Step 30: a default temperature $T_{default}$=Ti for i=1, i.e. T1 is determined as a starting value, for instance the upper temperature To or the lower temperature Tu.

Step 31: a decision is made whether the default temperature is to be used as the drying temperature.

Step 32 (31: yes): T is set to T1 and the process continues with the sequence shown in FIG. 4.

Step 33 (31: no): a first test print 22 with a first test chart 21 is printed and dried at temperature Ti with i=2. If a high default temperature has been selected (i.e. a temperature that is expected to be higher than the suitable temperature T), T2 is selected to be lower than T1, i.e. the drying temperature is reduced. Conversely, the drying temperature is increased if the initial default temperature was low.

Step 34: a camera is used to check, in a computer-assisted way, whether at least one or two, preferably all test patches 23a-c have dried in a satisfactory way and are for instance free from visible defects or defects that may be detected in the optical spectrum.

Step 35 (34: yes): an evaluation is made in a computer-assisted way to determine whether likewise at least one, preferably all test patches 23a-c, had dried in a satisfactory way in the previous step (i-1).

Step 36 (35: no): T=Ti-dT$_{safe}$ is set. In this case, dT$_{safe}$ is a temperature difference selected for safety reasons and defined as a specific value, preferably approximately 5° C. or lower. Then the process moves to the sequence shown in FIG. 4.

Step 37 (35: yes): the counter i is increased by one, Ti is increased by a predefined temperature difference dt, preferably about 5° C. or lower, and the process returns to step 33.

Step 38 (34: no): a computer-assisted evaluation is made to determine whether likewise at least one, preferably all test patches 23a-c had dried satisfactorily in the previous step (i-1).

Step 39 (38: yes): T=Ti-dT-dT$_{safe}$ is set. In this case, dT is the predefined temperature difference and dT$_{safe}$ is the temperature difference selected for safety reasons and defined to be a specific value. Then the process moves to the sequence shown in FIG. 4.

Step 40 (38: no): the counter i is increased by one, Ti is reduced by a predefined temperature step dt, preferably about 5° C. or lower, and the process returns to step 33.

Figure 4:
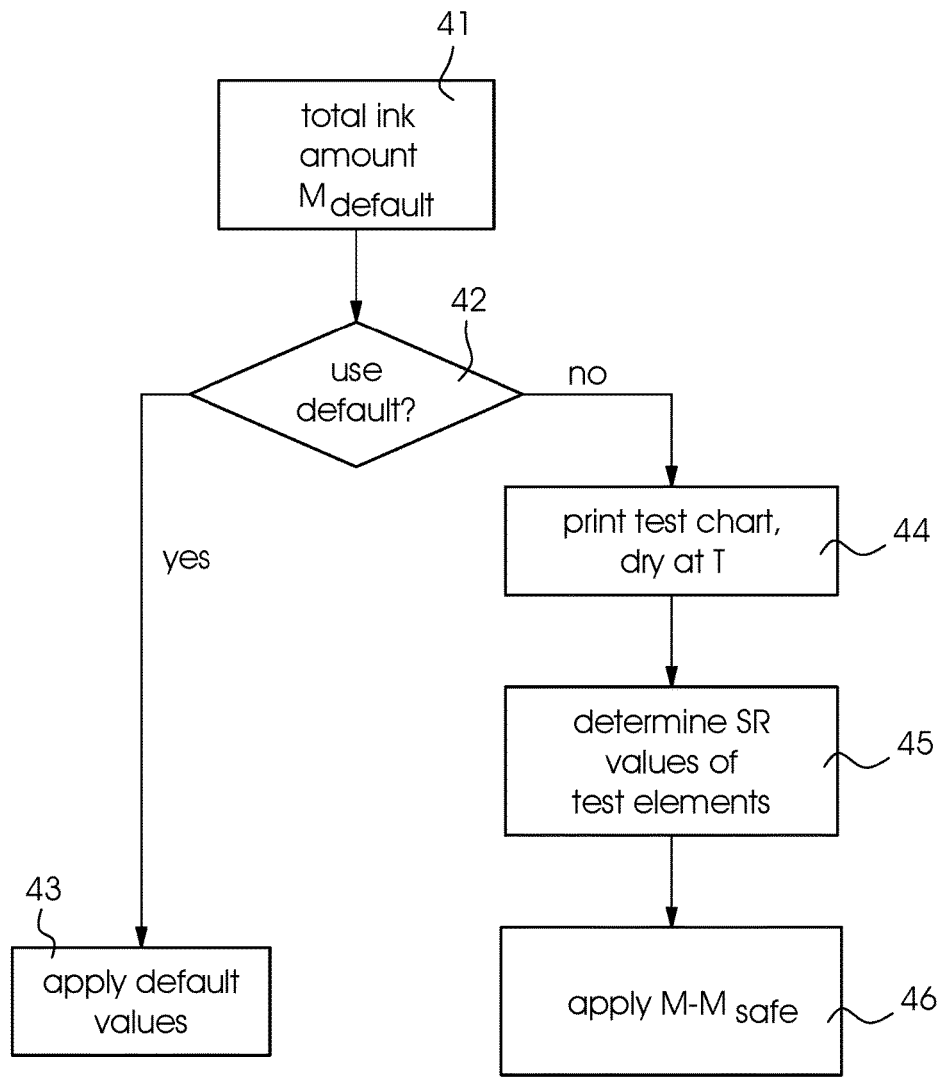
FIG. 4 is a flow chart of further steps of the preferred exemplary embodiment of the method of the invention.

The step-by-step sequence of the method shown in FIG. 4 corresponds to the sequence that has been described with reference to FIG. 2 and will be described below. The indicated steps are carried out in a computer-assisted way.

Step 41: a starting value for the default total ink amount M$_{default}$ is set.

Step 42: a decision is made whether the default total ink amount is to be used as the total amount of ink M.

Step 43 (42: yes): M=M$_{default}$ is set and T and M are provided for the printing operation. Then the print job is completed.

Step 44 (42: no): second test print 26 including a second test chart 25 is printed and dried at the predefined suitable temperature T.

Step 45: the test patches 27a-h (at least one or two thereof, preferably all patches) are evaluated by a sensor and in a computer-assisted way. In this process, the total amount of ink M matching the dryer temperature T that has already been determined is determined.

Step 46: M=M-M$_{safe}$ is set and T and M are provided for the printing operation. Then the print job is completed. In this context M$_{safe}$ is a total ink amount difference that has been selected for safety reasons and has been set to a given value.

The method represented in FIGS. 1 to 4 and described above may preferably be used to set up and operate an inkjet printing machine that has the following features: A sheet-processing inkjet printing machine for the industrial production of multicolor printed products in an inkjet printing process at a defined print solution such as 1,200×1,200 dpi and at a defined processing speed such as 2,500 sheets in a 70×100 format per hour. The machine includes a stack feeder, a precoat unit for applying a precoat, an inkjet printing unit for printing the image onto the sheets, a varnishing unit, and a stack delivery. The sheets are transported through the machine by cylinders and are preferably made of paper, alternatively of cardboard. The printing unit includes seven printing stations following one another in the direction of sheet transport. They transfer ink drops, preferably in the process colors KCMYOGV (black, cyan, magenta, yellow, orange, green, and violet). Every unit includes an assembly of print heads that are unmoved during the printing operation and are aligned to be substantially perpendicular to the direction of transport. Each one of them includes a plurality of individually controllable printing nozzles for generating the drops (drop on demand/DOD). The units allow a side of a sheet to be printed on over its entire width in a so-called single pass operation, i.e. the sheet sides are moved into the effective region of the units only once. The inks are water-based inks having drops which react with the precoat to form very sharp print dots. They contain pigments as colorants. The dryer is a thermal dryer having infrared lamps, preferably LED lamps, and is used to respectively evaporate water from the applied ink and the printing substrate. Further dryers may be provided, for instance downstream of the precoating unit and downstream of the varnishing unit and in the delivery. The machine further includes a machine control unit including a computer and a control program running on the computer. The computer may be a part of a non-illustrated control console. A device for supplying ink to the printing units and a device for cleaning the print heads are likewise not shown.

The following is a summary list of reference numerals and the corresponding structure used in the above description of the invention.

LIST OF REFERENCE SYMBOLS 10 machine
11 print heads
12 dryer
13 camera
14 sensor
15 computer
20 printing substrates
21 1st test chart
22 1st test prints
23a-c test patches
24 black ink
25 second test chart
26 second test prints
27a-h test patches
28 chromatic ink
30-46 steps
T temperature
Ti temperature
Tu low temperature
To high temperature
M total amount of ink

The invention claimed is:

1. A method for setting up and operating an inkjet printing machine for a print job, the method comprising the following steps:
providing an inkjet printing machine including at least three inkjet print heads and at least one thermal dryer for printing the print job onto a printing substrate using water-based black ink and at least two water-based chromatic inks by:
a) generating multiple first test prints of a first test chart with at least two or more test patches of different area coverages on the printing substrate using the water-based black ink, thermally drying the first test prints at different temperatures, and evaluating the dried first test prints to determine a temperature T for the operation of the dryer during the print job;
b) generating a second test print of a second test chart with at least two or more test patches of different ink amounts on the printing substrate using the at least two water-based chromatic inks, thermally drying the second test print at the temperature T, and evaluating the dried second test print to determine a total amount M of ink for the operation of the print heads during the print job; and c) providing the temperature T and the total amount of ink M to the inkjet printing machine for the print job and carrying out the print job.

2. The method according to claim 1, which further comprises carrying out the step of evaluating the dried first test prints by inspecting at least one test patch of the first test chart to determine whether at least one of the dried printing material or the dried water-based black ink is free from visible defects.

3. The method according to claim 2, which further comprises carrying out the evaluating step in all test patches of the first test chart.

4. The method according to claim 2, which further comprises optically scanning the dried first test prints in the evaluating step.

5. The method according to claim 4, which further comprises using an optical camera in the optical scanning step.

6. The method according to claim 1, which further comprises carrying out the step of evaluating the dried second test chart by inspecting at least one test patch of the second test chart to determine whether the dried water-based chromatic inks reach or stay below a defined resistance threshold.

7. The method according to claim 6, which further comprises selecting the defined resistance threshold as an SR value.

8. The method according to claim 6, which further comprises carrying out the evaluating step in all test patches of the second test chart.

9. The method according to claim 6, which further comprises examining the dried second test print for evaluation by using a resistance measurement.

10. The method according to claim 9, which further comprises using a resistance sensor for the resistance measurement.

* * * * *